(12) United States Patent
Yang

(10) Patent No.: US 12,190,107 B2
(45) Date of Patent: Jan. 7, 2025

(54) COMPUTER IMPLEMENTATION METHOD FOR SOFTWARE ARCHITECTURE ANALYSIS AND SOFTWARE ARCHITECTURE ANALYSIS APPARATUS

(71) Applicant: Huawei Cloud Computing Technologies Co., Ltd., Guizhou (CN)

(72) Inventor: Shaobing Yang, Shanghai (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 208 days.

(21) Appl. No.: 17/720,797

(22) Filed: Apr. 14, 2022

(65) Prior Publication Data

US 2022/0236983 A1 Jul. 28, 2022

Related U.S. Application Data

(63) Continuation of application No. PCT/CN2020/121893, filed on Oct. 19, 2020.

(30) Foreign Application Priority Data

Oct. 18, 2019 (CN) .......................... 201910994945.2
Dec. 30, 2019 (CN) .......................... 201911399723.2

(51) Int. Cl.
G06F 8/75 (2018.01)
(52) U.S. Cl.
CPC ...................................... *G06F 8/75* (2013.01)
(58) Field of Classification Search
CPC ................. G06F 8/75; G06F 8/73; G06F 8/74
See application file for complete search history.

(56) References Cited

U.S. PATENT DOCUMENTS

| | | | |
|---|---|---|---|
| 8,832,662 B2 * | 9/2014 | Eade | G06F 11/3696 717/126 |
| 11,194,688 B1 * | 12/2021 | Featonby | G06F 11/004 |
| 2005/0160411 A1 | 7/2005 | Sangal et al. | |
| 2010/0058288 A1 | 3/2010 | Zitzewitz et al. | |

(Continued)

FOREIGN PATENT DOCUMENTS

| | | |
|---|---|---|
| CN | 101281466 A | 10/2008 |
| CN | 102722362 A | 10/2012 |

(Continued)

OTHER PUBLICATIONS

Weixin_34095889, "Dry goods: detailed analysis of software architecture," CSDN blog, with an English machine translation, Mar. 11, 2018, 31 pages.

(Continued)

*Primary Examiner* — Wei Y Zhen
*Assistant Examiner* — Amir Soltanzadeh
(74) *Attorney, Agent, or Firm* — Conley Rose, P.C.

(57) ABSTRACT

An architecture analysis apparatus (106) receives an architecture model input by a user, and analyzes a plurality of modules included in the architecture model to obtain a call relationship between the modules. Then, the plurality of modules are allocated to different layers based on an architecture setting entered by the user, whether a call relationship between the plurality of modules complies with a call rule is detected, and a detection result is displayed to the user by using an interface.

20 Claims, 11 Drawing Sheets

Software architecture analysis system 100

(56) References Cited

U.S. PATENT DOCUMENTS

| | | | | |
|---|---|---|---|---|
| 2012/0054714 A1* | 3/2012 | Novak | ................ | H04L 41/0853 |
| | | | | 717/105 |
| 2013/0060824 A1 | 3/2013 | Hadar et al. | | |
| 2013/0305224 A1* | 11/2013 | Eade | ......................... | G06F 8/20 |
| | | | | 717/126 |
| 2017/0169230 A1* | 6/2017 | Zheng | .................... | G06N 20/00 |
| 2019/0163446 A1* | 5/2019 | Brunel | ....................... | G06F 8/74 |
| 2020/0026701 A1* | 1/2020 | Duncan | ............... | G06F 16/2379 |
| 2020/0065227 A1* | 2/2020 | Gao | .......................... | G06F 8/42 |
| 2022/0236983 A1 | 7/2022 | Yang | | |
| 2023/0199504 A1* | 6/2023 | Raley | .................... | H04H 20/95 |
| | | | | 726/4 |

FOREIGN PATENT DOCUMENTS

| | | | |
|---|---|---|---|
| CN | 107103244 A | 8/2017 | |
| CN | 109491728 A | 3/2019 | |
| CN | 109492144 A | 3/2019 | |
| CN | 105745620 B | 4/2019 | |
| CN | 110221929 A | 9/2019 | |
| CN | 111176724 A | 5/2020 | |

OTHER PUBLICATIONS

Leo Pruijt et al., "Dependency Related Parameters in the Reconstruction of a Layered Software Architecture," ECSAW"16, Nov. 28-Dec. 2, 2016, 7 pages.

Jason McC. Smith, "Elemental Design Patterns: A Formal Semantics for Composition of OO Software Architecture," Jan. 2003, 9 pages.

* cited by examiner

| Layer sequence number | Layer ID | Whether an intra-layer call is allowed | Whether an adjacent-layer call is allowed | Whether a cross-layer call is allowed | Whether a reverse call is allowed |
|---|---|---|---|---|---|
| ... | | | | | |
| 3 | UI | Yes | Yes | No | Null |
| 2 | BL | Yes | Yes | Null | No |
| 1 | DA | No | Yes | No | No |

| Layer ID | Module ID |
|---|---|
| UI | Module 1 |
| --- | Module 2 |
| ... | ... |
| ... | ... |
| DA | Module 9 |

COMPUTER IMPLEMENTATION METHOD FOR SOFTWARE ARCHITECTURE ANALYSIS AND SOFTWARE ARCHITECTURE ANALYSIS APPARATUS

CROSS-REFERENCE TO RELATED APPLICATIONS

This is a continuation of Int'l Patent App. No. PCT/CN2020/121893 filed on Oct. 19, 2020, which claims priority to Chinese Patent App. No. 201911399723.2 filed on Dec. 30, 2019 and Chinese Patent App. No. 201910994945.2 filed on Oct. 18, 2019, all of which are incorporated by reference.

FIELD

This disclosure relates to the field of computer technologies, and in particular, to a computer implementation method for software architecture analysis, an apparatus for executing the method, and a computer system.

BACKGROUND

Users often need to layer a software architecture in processes of software architecture development to separate service complexity, technical complexity, and service content by layering. High intra-layer cohesion and low inter-layer coupling improve reusability of a software architecture and make the software architecture easy to maintain. Because of the foregoing advantages, currently a layered architecture is a popular and widely used architecture mode. In a conventional technology, efficiency of software architecture developers is low in managing layered architectures.

SUMMARY

This disclosure provides a computer implementation method for software architecture analysis, which improves efficiency of software architecture analysis and management.

A first aspect provides a computer implementation method for software architecture analysis, where the method is implemented by using a computer, and the method includes the following steps:

An architecture analysis module imports an architecture model, where the architecture model includes a plurality of modules, and each module includes at least one file. Each file may call a file of another module. A call between files is also referred to as a call between modules to which the files belong.

The architecture analysis module analyzes files included in the plurality of modules to obtain module call information, where the module call information includes a call relationship between the plurality of modules.

Subsequently, the architecture analysis module obtains an architecture setting, where the architecture setting includes a layering rule and a call rule, the layering rule includes set information of a plurality of layers and a module included at each of the plurality of layers, and the call rule includes a call rule between modules located at different layers (inter-layer call rule) and/or a call rule between modules included at each layer (intra-layer call rule).

The architecture analysis module indicates a display driver to generate a layered architecture presentation interface based on the layering rule and the module call information, where in the layered architecture presentation interface, each module is allocated to an area corresponding to a layer including the module.

The architecture analysis module detects the module call information based on the call rule, and displays a detection result by using the layered architecture presentation interface. That is, the architecture analysis module indicates the display driver to display the detection result in the layered architecture presentation interface.

The architecture analysis module is used to analyze the call relationship between the modules, detect a matching degree between the call relationship and the call rule, and visually displays a detection result on an interface, so that efficiency of architecture analysis and architecture management is improved, and difficulty in architecture analysis and architecture management is reduced.

In a possible implementation, after the module call information is obtained, the architecture analysis module further indicates the display driver to generate a module call relationship interface, and displays the call relationship between the modules on the module call relationship interface. The module call relationship interface is shown by using an interface, so that a user can visually obtain a call relationship between the modules in the architecture model, and operation difficulty of architecture analysis is reduced.

In a possible implementation, the set information of the plurality of layers includes a sequence number of each layer; and in the layered architecture presentation interface, a location of each layer is set based on the sequence number of the layer. For example, a layer with a smaller sequence number is lower in the layered architecture presentation interface, or a layer with a larger sequence number is lower in the layered architecture presentation interface.

In a possible implementation, the set information of the plurality of layers further includes an identity ID of each layer, and in the layered architecture presentation interface, the ID of each layer is set in a corresponding area of the layer.

In a possible implementation, the analyzing files included in the plurality of modules to obtain module call information includes: counting a quantity of times that a file included in each module calls a file included in another module, to obtain a quantity of times of calls between the plurality of modules. Counting the quantity of times of calls between the plurality of modules helps effectively manage calls between the modules.

In a possible implementation, the quantity of times of calls between the plurality of modules is displayed in the layered architecture presentation interface. The quantity of times of calls between the plurality of modules is displayed in a visual manner, thereby implementing better management of calls between the modules.

Further, the quantity of times of calls between the modules is also displayed in the interface, so that a user can obtain an analysis result of the architecture more intuitively and quickly, thereby improving efficiency of subsequent architecture management.

In a possible implementation, the call relationship between the plurality of modules is displayed by using an arrow in the layered architecture presentation interface. Then, the displaying a detection result by using the layered architecture presentation interface includes: changing, in the layered architecture presentation interface, a color and/or a format of an arrow corresponding to a call that is between modules and that violates the call rule. In this case, if the module call information further includes the quantity of times of calls between the plurality of modules, the quantity of times of calls may be displayed above the arrow.

The call relationship between the modules is shown by using a visual graph, so that readability of an architecture analysis result is further improved, and complexity in architecture analysis and management is reduced.

In a possible implementation, the call rule between modules located at different layers includes any one or more of the following: an adjacent-layer call rule, a cross-layer call rule, and a reverse call rule.

The adjacent-layer call rule indicates whether a call between modules at layers with adjacent layer sequence numbers is allowed. The cross-layer call rule indicates whether a call between modules at layers with non-adjacent layer sequence numbers is allowed. The reverse call rule indicates whether a module at a lower layer in the software architecture calls a module at an upper layer in the software architecture is allowed. In addition, the intra-layer call rule indicates whether a call between modules at a same layer is allowed.

A call rule is generally formulated by a user based on a requirement of a software architecture design. By using the method provided, the user may see, in a detection result, a degree of compliance between the architecture model and the design requirement, so as to subsequently improve the architecture model.

In a possible implementation, the architecture analysis module may further detect a loop call, and display a detection result of the loop call by using the layered architecture presentation interface. An inter-module loop call indicates that one module is called by another module called by the module.

In a possible implementation, in the layered architecture presentation interface, colors of areas corresponding to adjacent layers are different.

In a possible implementation, in the layered architecture presentation interface, textures of areas corresponding to adjacent layers are different.

Different presentation manners (colors and/or textures) are used for areas corresponding to adjacent layers, so that the user can distinguish between different areas in the interface more conveniently, and efficiency of architecture management is improved.

A second aspect provides a software architecture analysis apparatus, including: a module analysis unit, an architecture design unit, and a rule detection unit.

The module analysis unit is configured to import an architecture model, where the architecture model includes a plurality of modules, and each module includes at least one file; and analyze files included in the plurality of modules to obtain module call information, where the module call information includes a call relationship between the plurality of modules.

The architecture design unit is configured to obtain an architecture setting, where the architecture setting includes a layering rule and a call rule, the layering rule includes set information of a plurality of layers and a module included at each of the plurality of layers, and the call rule includes a call rule between modules located at different layers and/or a call rule between modules included at each layer; and indicate a display driver to generate a layered architecture presentation interface based on the layering rule and the module call information, where in the layered architecture presentation interface, each module is allocated to an area corresponding to a layer including the module.

The rule detection unit is configured to detect the module call information based on the call rule, and display a detection result by using the layered architecture presentation interface. The rule detection unit indicates, based on the detection result, a display driver to display the detection result in the layered architecture presentation interface.

In a possible implementation, the set information of the plurality of layers includes a sequence number of each layer; and in the layered architecture presentation interface, a location of each layer is set based on the sequence number of the layer.

In a possible implementation, the module analysis unit is configured to count a quantity of times that a file included in each module calls a file included in another module, to obtain a quantity of times of calls between the plurality of modules.

In a possible implementation, the quantity of times of calls between the plurality of modules is displayed in the layered architecture presentation interface.

The module analysis unit is configured to count a quantity of times that a file included in each module calls a file included in another module, to obtain a quantity of times of calls between the plurality of modules.

In a possible implementation, the call relationship between the plurality of modules is displayed by using an arrow in the layered architecture presentation interface.

In a possible implementation, the rule detection unit is further configured to indicate the display driver to change, in the layered architecture presentation interface, a color and/or a format of an arrow corresponding to a call that is between modules and that violates the call rule.

In a possible implementation, the call rule between modules located at different layers includes any one or more of the following: an adjacent-layer call rule, a cross-layer call rule, and a reverse call rule.

In a possible implementation, in the layered architecture presentation interface, colors of areas corresponding to adjacent layers are different.

In a possible implementation, in the layered architecture presentation interface, textures of areas corresponding to adjacent layers are different.

The second aspect and the possible implementations of the second aspect correspond to the first aspect and the possible implementations of the first aspect. Therefore, technical effects of the second aspect and the possible implementations of the second aspect are not described herein again.

A third aspect provides a computer system, including at least one computer, where each computer includes a processor and a memory. The processor of the at least one computer is configured to access instructions in the memory of the at least one computer to perform the method provided in the first aspect and the possible implementations of the first aspect.

A fourth aspect provides a non-transient computer-readable storage medium. When instructions stored in the non-transient readable storage medium are executed by a computer system, the computer system performs the method provided in the first aspect and the possible implementations of the first aspect. The storage medium stores program instructions. The storage medium includes but is not limited to a volatile memory, for example, a random access memory, and a nonvolatile memory, for example, a flash memory, a hard disk drive (HDD), and a solid-state drive (SSD).

A fifth aspect provides a computer program product. When instructions included in the computer program product are executed by a computer system, the computer system performs the method provided in the first aspect and the possible implementations of the first aspect. The computer program product may be a software installation package. In a case in which the method provided in the first aspect and the possible implementations of the first aspect needs to be used, the computer program product may be downloaded, and instructions included in the computer program product may be executed on the computer system.

BRIEF DESCRIPTION OF THE DRAWINGS

To describe the technical method in embodiments more clearly, the following briefly describes the accompanying drawings for describing the embodiments.

DETAILED DESCRIPTION

The following describes the technical method in embodiments with reference to the accompanying drawings in embodiments.

Figure 1:
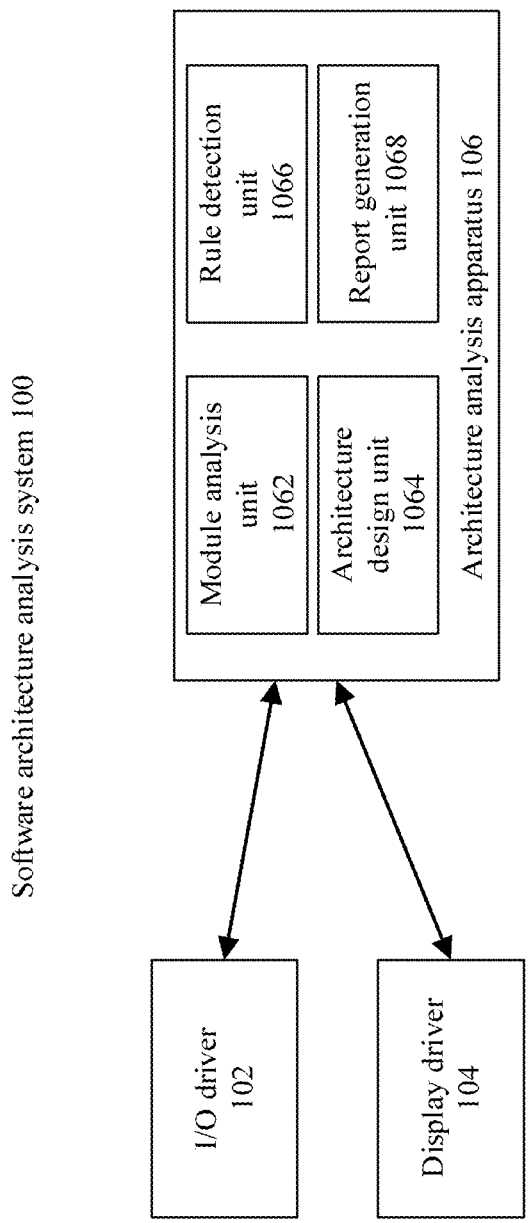
FIG. 1 is a schematic architectural diagram of a software architecture analysis system.

Referring to FIG. 1, a software architecture analysis system 100 includes an input/output (IO) driver 102, a display driver 104, and an architecture analysis apparatus 106. The architecture analysis apparatus 106 includes a module analysis unit 1062, an architecture design unit 1064, a rule detection unit 1066, and a report generation unit 1068. The foregoing apparatuses and units may be software apparatuses/units, and functions of the apparatuses and units are implemented by using software instructions. The I/O driver 102 is configured to manage an I/O device of a computer, and receive, by using the I/O device, various types of information input by a user. The display driver 104 has a capability of rendering an interface based on various types of information and controlling a display device to display a rendering result.

Further, each apparatus in the software architecture analysis system 100 has two deployment manners. In a first deployment manner, the I/O driver 102, the display driver 104, and the architecture analysis apparatus 106 are all deployed on a same computer. In the first deployment manner, the software analysis system 100 is generally provided as a software analysis tool for a user, and the user deploys the entire software architecture analysis system 100 on a local computer.

Figure 2:
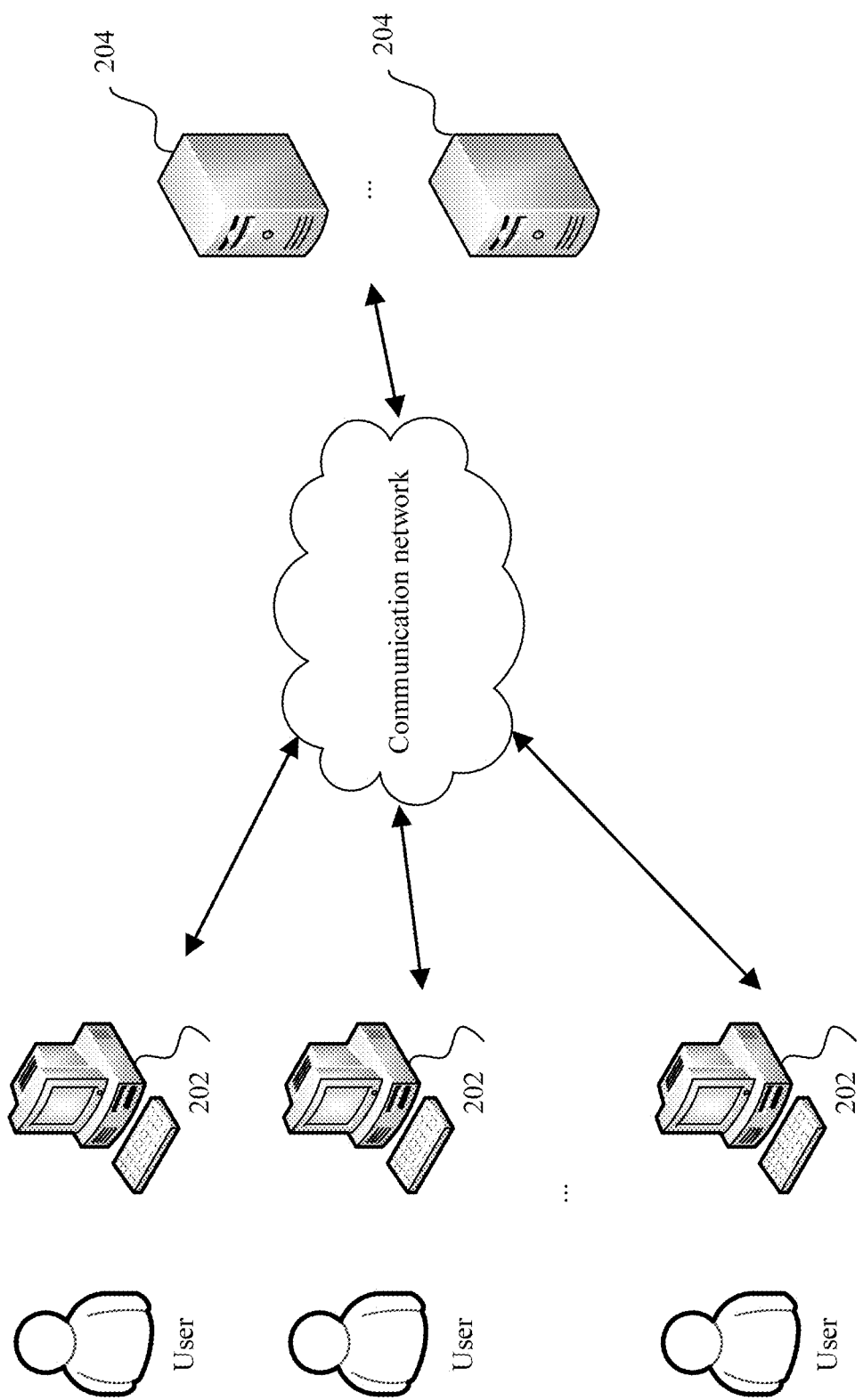
FIG. 2 is a schematic architectural diagram of another software architecture analysis system.

In a second deployment manner, in a computer system provided in FIG. 2, an I/O driver 102 and a display driver 104 are deployed in each computer 202, and an architecture analysis apparatus 106 is deployed in a cluster of computers 204. The computer 202 is connected to the cluster of computers 204 by using a communication network. The computer 202 is a user-side computer, and the cluster of computers 204 is a remote computer. The computer may be, for example, a smartphone, a personal digital assistant (PDA), a tablet computer, a laptop computer, a personal computer (PC), or a server. The communication network may be a wired communication network, or a wireless communication network, for example, a 5th generation (5G) mobile communication technology system, a Long-Term Evolution (LTE) system or Wi-Fi.

In the second deployment manner, each computer 204 may be deployed with the module analysis unit 1062, the architecture design unit 1064, the rule detection unit 1066, and the report generation unit 1068. Alternatively, some of the module analysis unit 1062, the architecture design unit 1064, the rule detection unit 1066, and the report generation unit 1068 are deployed in each computer 204, and all units of the architecture analysis apparatus 106 are deployed in the cluster of computers 204. The cluster of computers 204 as a whole provides a function of the architecture analysis apparatus 106 for the user-side computer 202. In this case, the architecture analysis apparatus 106 runs on a plurality of computers 204 in a distributed mode, providing an architecture analysis service with higher performance. In the second deployment manner, an architecture analysis service is generally provided as a remote service, for example, a cloud service, for a user to use. The user can obtain the architecture analysis service by only deploying the I/O driver 102 and the display driver 104 on a local computer. The I/O driver 102 and the display driver 104 are parts of a client of the architecture analysis service.

A software architecture analysis method is described below with reference to FIG. 3 to FIG. 8.

Step 402: An I/O driver 102 receives an architecture model input by a user, and sends the architecture model to a module analysis unit 1062. The architecture model includes software architecture-related information generated in a software development process. The architecture model includes a plurality of modules of a software architecture, where a file included in each module records a call by the file to a file in another module.

A module is a software code set with a specific function, such as a component or a service. For example, the component may be an independent entity that is logically divided in the C/C++ language, and a file included in the component may be a .h file, a .so file, a .dll file, or the like. The service refers to a module that can be independently deployed and run in a service-oriented scenario. Services coordinate and cooperate with each other to provide a logical service function for a user. Each service runs in its own independent process, and services collaborate with each other by using a lightweight communication mechanism (usually a RESTful API based on Hypertext Transfer Protocol (HTTP)).

Each module includes at least one file. A file included in one module may call a file in another module. For example, a module A includes header files, such as math.h and stdio.h, and a file of a module B calls both of the header files. For example, the files stdio.h and math.h are called by the file of the module B by using instructions "#include <stdio.h>" and "#include <math.h>". In this case, it is considered that the file in the module B calls the file in the module A two times, and it is also considered that the module B calls the module A two times. In the following figures, a call by the module B to the module A is indicated by an arrow from the module B to the module A. One module may include one or more files, and each file may call one or more files in another module. Therefore, one module may call another module once or more times. A module analysis unit 1062 counts a quantity of times that a file included in each module calls a file included in another module, to obtain a quantity of times of calls between a plurality of modules. For example, if the module B includes 10 files, and each of the 10 files calls the files math.h and stdio.h, the module B calls the module A for 20 times. In the following figures, a number above an arrow that presents a call by the module B to the module A indicates a quantity of times that the module B calls the module A.

Step 404: The module analysis unit 1062 imports the architecture model, analyzes the architecture model, and obtains module call information in the architecture model, where the module call information includes a call relationship between modules.

Optionally, the module call information further includes a quantity of times of calls between modules.

After step 404, optionally, step 4041 and step 4042 may be performed.

Step 4041: The module analysis unit 1062 generates the module call information based on an analysis result in step 404, and sends the module call information to a display driver 104.

Step 4042: The display driver 104 generates a module call information presentation interface based on the module call information, and displays the module call information presentation interface on a display device of a computer 202.

Figure 4:
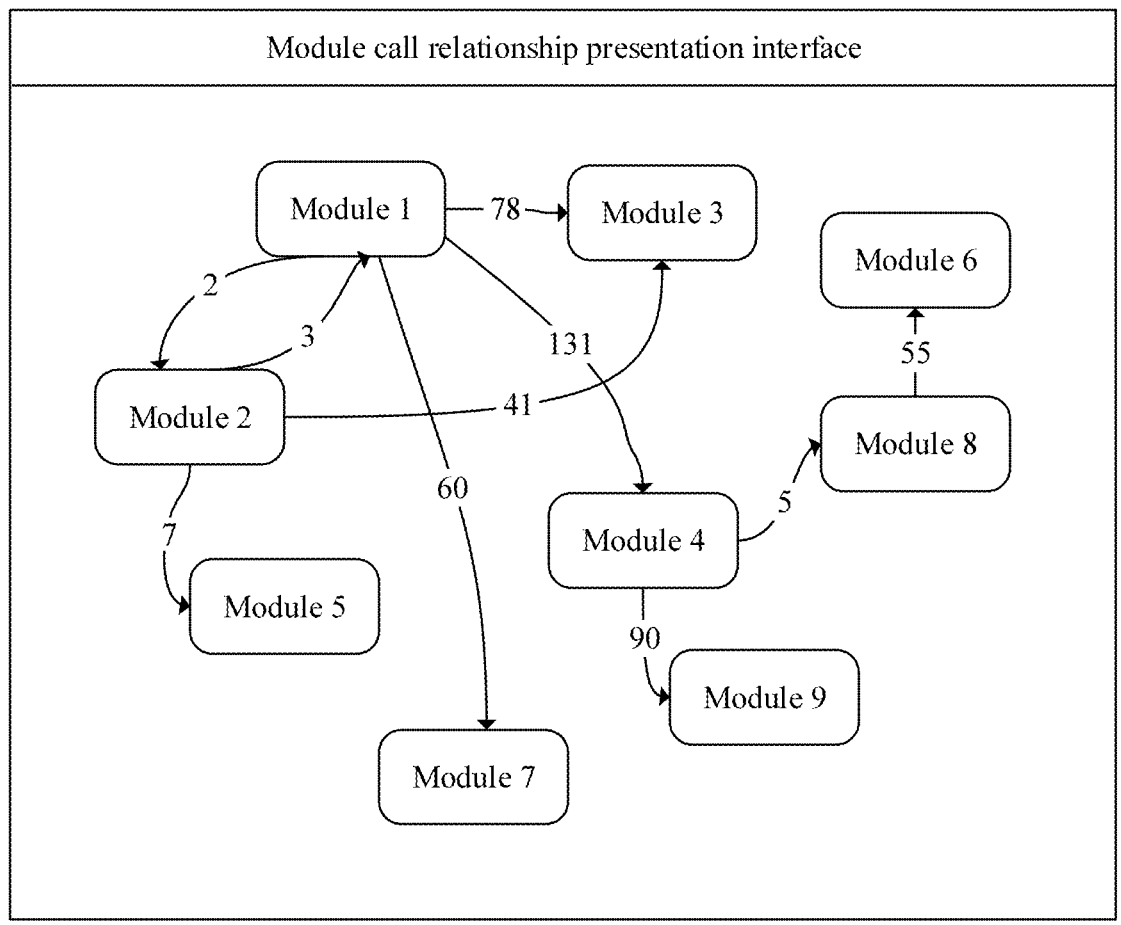
FIG. 4 is a schematic diagram of a module call information presentation interface.

As shown in FIG. 4, in the module call information presentation interface, the call relationship between modules is displayed by using an arrow. A call relationship between a module 1 and a module 3 in the figure is used as an example. An arrow (an arrow points from the module 1 to the module 3) is provided between the module 1 and the module 3, and a quantity of times of calls is marked as 78. This indicates that the module 1 calls the module 3 for 78 times in total.

Optionally, when the analysis result obtained by the module analysis unit 1062 in step 404 further includes the quantity of times of calls between modules, the quantity of times of calls between the modules is further displayed by using a number above an arrow in the module call information presentation interface.

After the module call information is obtained by using the module analysis unit 1062, the module call information is displayed to the user through the interface, thereby improving understanding of the architecture model by the user and reducing costs of analyzing a software architecture for the user.

Step 406: The I/O driver 102 receives an architecture setting input by the user, and sends the architecture setting to an architecture design unit 1064.

To further manage modules, the user needs to perform layered management on the modules included in the architecture model. Generally, functions of modules included at each layer are similar, and a set of modules at each layer implements a logical function for the user.

A common layering method includes a four-layer architecture, including a representation layer, an application layer, a business logic layer, and a persistence layer. The representation (UI) layer is used to receive a request of the user, return data to the user, and provide an interactive operation interface for the user. The application layer (also referred to as a service layer) is used to decouple the representation layer from the business logic layer. The business logic (BL) layer (also referred to as a domain layer) is used to embody a user request, that is, parse the user request into a specific operation at a data access layer. The data access (DA) layer (also referred to as a persistence layer) is used to perform the specific operation parsed out by the business logic layer. As the bottom layer of the architecture, the data access layer generally includes modules such as a database and a file system.

Another common layering method includes a three-layer architecture, including a data access layer, a business logic layer, and a representation layer. In the following figures, a three-layer architecture is used for presentation. The business logic layer in the three-layer architecture may be formed by combining the application layer and the business logic layer in the four-layer architecture.

There is a plurality of architecture layering methods in practice. A total quantity of layers, a layer sequence number, a layer identity (ID), and a function of each layer can be changed based on different service requirements and user design habits.

The architecture setting includes a layering rule and a call rule that are included in the architecture model imported to the architecture analysis apparatus 106 in step 402. The layering rule includes set information of a plurality of layers, for example, a layer sequence number, a layer ID, and a module included at each of the plurality of layers.

A layer sequence number of a layer is used to indicate a location of the layer in the software architecture. The architecture analysis apparatus 106 sets a location of each layer in the layered architecture presentation interface based on the layer sequence number. For example, a sequence number of the UI layer is 3, a sequence number of the BL layer is 2, and a sequence number of the DA layer is 1. Under this numbering rule, a layer with a larger layer sequence number is closer to the user, and a layer with a smaller layer sequence number is farther away from the user and closer to the bottom layer. For another example, a sequence number of the UI layer is 1, a sequence number of the BL layer is 2, and a sequence number of the DA layer is 3. Under this numbering rule, a layer with a smaller layer sequence number is closer to the user, and a layer with a larger layer sequence number is farther away from the user and closer to the bottom layer. For example, the former numbering rule is used below. Under the layering rule, the modules included at each layer are used to allocate the modules included in the architecture model obtained in step 402 to the layers. Generally, a layer ID and modules included at each layer are correspondingly recorded in an architecture setting, for example, layer ID 1: module 1/module 2/module 3, which indicates that a layer whose ID is 1 includes the module 1, the module 2, and the module 3.

The call rule includes a call rule between modules located at different layers and/or a call rule between modules included at each layer. The call rule between modules included at each layer is also referred to as an intra-layer call rule. The call rule between modules of different layers can be any or more of the following: an adjacent-layer call rule, a cross-layer call rule, and a reverse call rule. Based on an actual design requirement of the software architecture, the call rule may further include another rule that indicates a call between modules at a same layer/different layers. The intra-layer call rule indicates whether a call between modules at a same layer is allowed. The adjacent-layer call rule indicates whether a call between modules at layers with adjacent layer sequence numbers is allowed. The cross-layer call rule indicates whether a call between modules at layers with non-adjacent layer sequence numbers is allowed. The reverse call rule indicates whether a module at a lower layer in the software architecture calls a module at an upper layer in the software architecture is allowed. Under the foregoing former numbering rule, a sequence number of a lower layer in the software architecture is smaller.

In an implementation, the user may use the I/O driver 102 to send an instruction that carries the architecture setting to the architecture design unit 1064, for example, an application programming interface (API) instruction.

Figure 5:
FIG. 5 is a schematic diagram of an architecture setting interface.

As shown in FIG. 5, in another implementation, the architecture design unit 1064 indicates the display driver 104 to generate an architecture setting interface. In the architecture setting interface, the user can enter an architecture setting by editing a visual interface, so that the user can quickly set a layer sequence number, a layer ID, a module included at each layer, and a call rule. For example, if the user taps the "+" symbol in a layer sequence number column of the architecture setting interface, the architecture setting interface will automatically generate a row of configuration corresponding to a next layer sequence number. In a row corresponding to each layer sequence number, the customer can enter a layer ID and a call rule. Further, after the user taps a layer ID, a module configuration sub-interface will pop up in the architecture setting interface. In the module configuration sub-interface, the user may map each module imported in step 402 to a layer ID. Therefore, the user can configure the module included at each layer by using the module configuration sub-interface.

In FIG. 5, the user has set the DA layer, the BL layer, and the UI layer, and their layer sequence numbers are respectively 1, 2, and 3. Call rules of the DA layer are as follows: an intra-layer call is not allowed, an adjacent-layer call is allowed, a cross-layer call is not allowed, and a reverse call is not allowed. Call rules of the BL layer are as follows: an intra-layer call is allowed, an adjacent-layer call is allowed, and a reverse call is not allowed. Because the software architecture has only three layers, there is no possibility of a cross-layer call at the BL layer. Therefore, the cross-layer call column corresponding to the BL layer is null. Call rules of the UI layer are as follows: an intra-layer call is allowed, an adjacent-layer call is allowed, and a cross-layer call is not allowed. Because the UI layer is the top layer in the software architecture, there is no possibility of a reverse call to a higher layer. Therefore, the reverse call column corresponding to the UI layer is Null.

In FIG. 5, after the user taps BL in the layer ID column, the module configuration sub-interface of the BL layer is entered. In the module configuration sub-interface, it can be seen that some modules have been allocated to the UI layer and the DA layer. Therefore, the user can allocate the remaining modules to the BL layer. A specific allocation method may be filling BL in a layer ID corresponding to a module ID. In the following instance, architecture modules include modules 1 to 9, where the UI layer includes the module 1, the module 4, and the module 6, the BL layer includes the module 2, the module 8, and the module 7, and the DA layer includes the module 5, the module 3, and the module 9.

Step 408: The architecture design unit 1064 indicates, based on the module call information and a layering rule, the display driver 104 to generate a layered architecture presentation interface.

Figure 6:
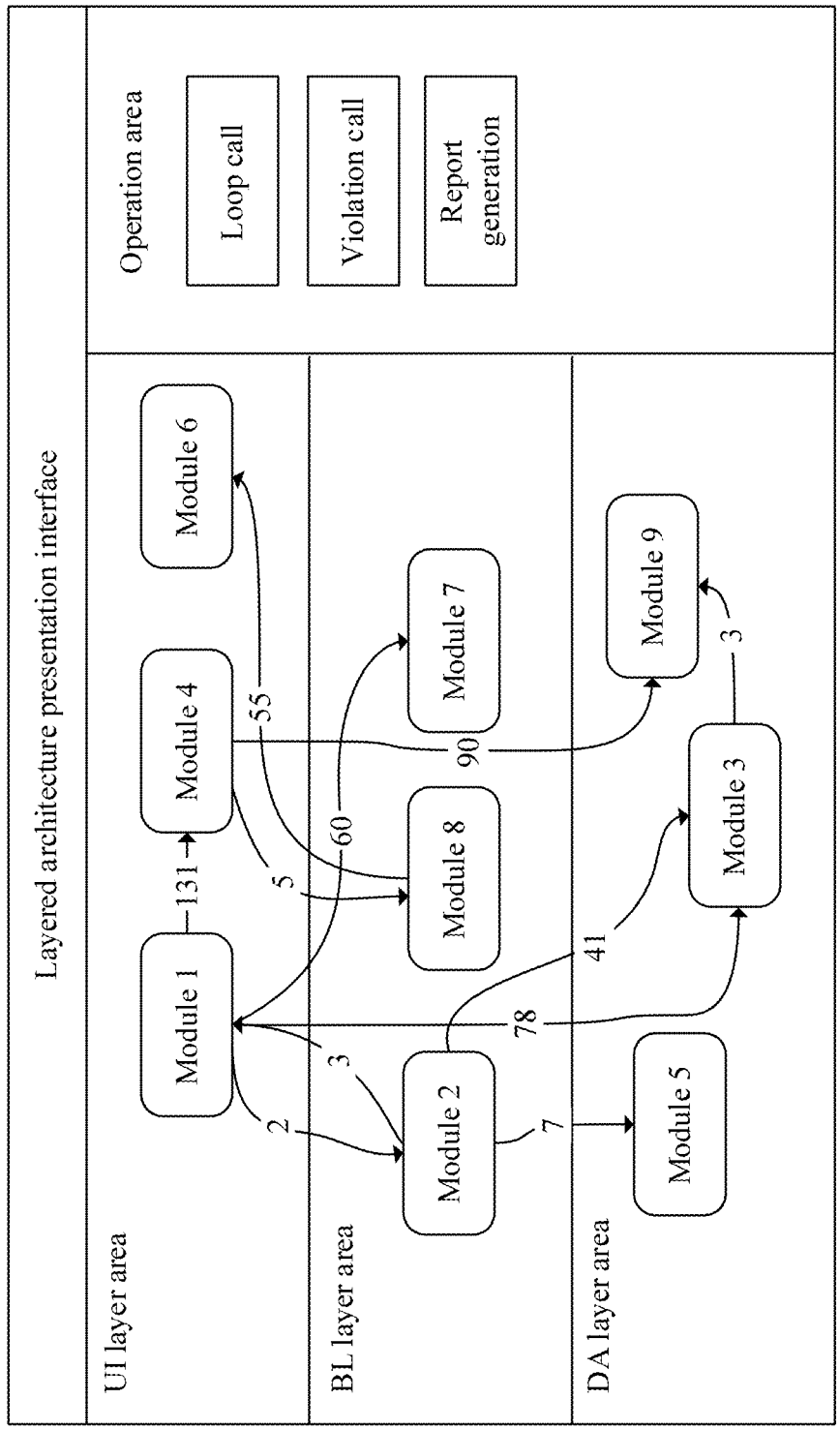
FIG. 6 is a schematic diagram of a layered architecture presentation interface.

In the layered architecture presentation interface, areas corresponding to different layers are divided based on the layer sequence number and the layer ID. The module included at each layer is set in an area of the layer. Generally, a location of an area corresponding to a layer that is closer to the user is higher in the layered architecture presentation interface. As shown in FIG. 6, a layered architecture presentation interface includes a UI layer area, a BL layer area, and a DA layer area. Deployment locations of the modules in FIG. 4 are re-deployed based on modules included at each layer in an architecture setting, and a call relationship between modules and a quantity of times of calls between the modules in FIG. 4 are inherited in FIG. 6.

Optionally, different colors may be used to represent adjacent layer areas (not shown in the figure). A same color may be used to represent non-adjacent layer areas (not shown in the figure). Different colors are used to represent areas corresponding to adjacent layers, so as to improve user experience and help the user to distinguish between different layer areas.

Optionally, different background textures may be used to represent adjacent layer areas (not shown in the figure). A same background texture may be used to represent non-adjacent layer areas (not shown in the figure). Different background textures are used to represent adjacent layer areas, so as to improve user experience and help the user to distinguish between different layer areas.

Optionally, a blank area may be included between the adjacent layer areas, so as to help the user to distinguish between different layer areas.

The foregoing manners in which a color, a texture, and a blank area are used to represent different areas in the layered architecture presentation interface may be combined at random, and any one of the color, the texture, and the blank area may be used independently, or any two or three of the color, the texture, and the blank area may be used in combination.

The layered architecture presentation interface further includes an operation area, and the operation area includes at least one operation entry. The operation entry includes one or more of the following: "violation call" and "report generation". When the user taps different operation entries, a rule detection unit 1066 is triggered to perform different actions.

Further, because a user that analyzes the software architecture may be interested in a loop call between modules, a loop call operation entry may be provided in the operation area. The loop call between modules indicates that one module is called by another module that is called by the module, that is, each of the two modules includes a file that is called by the other module, so that a loop is formed. The module call relationship presentation interface in FIG. 4 is used as an example. The module 1 and the module 2 call each other, that is, each of the module 1 and the module 2 includes a file called by the other module, so that a loop call is formed between the module 1 and the module 2.

Step 410: The rule detection unit 1066 detects the module call information based on different operation entries tapped by the user in the operation area of the layered architecture presentation interface, and indicates the display driver 104 to provide a detection result to the user.

Figure 7:
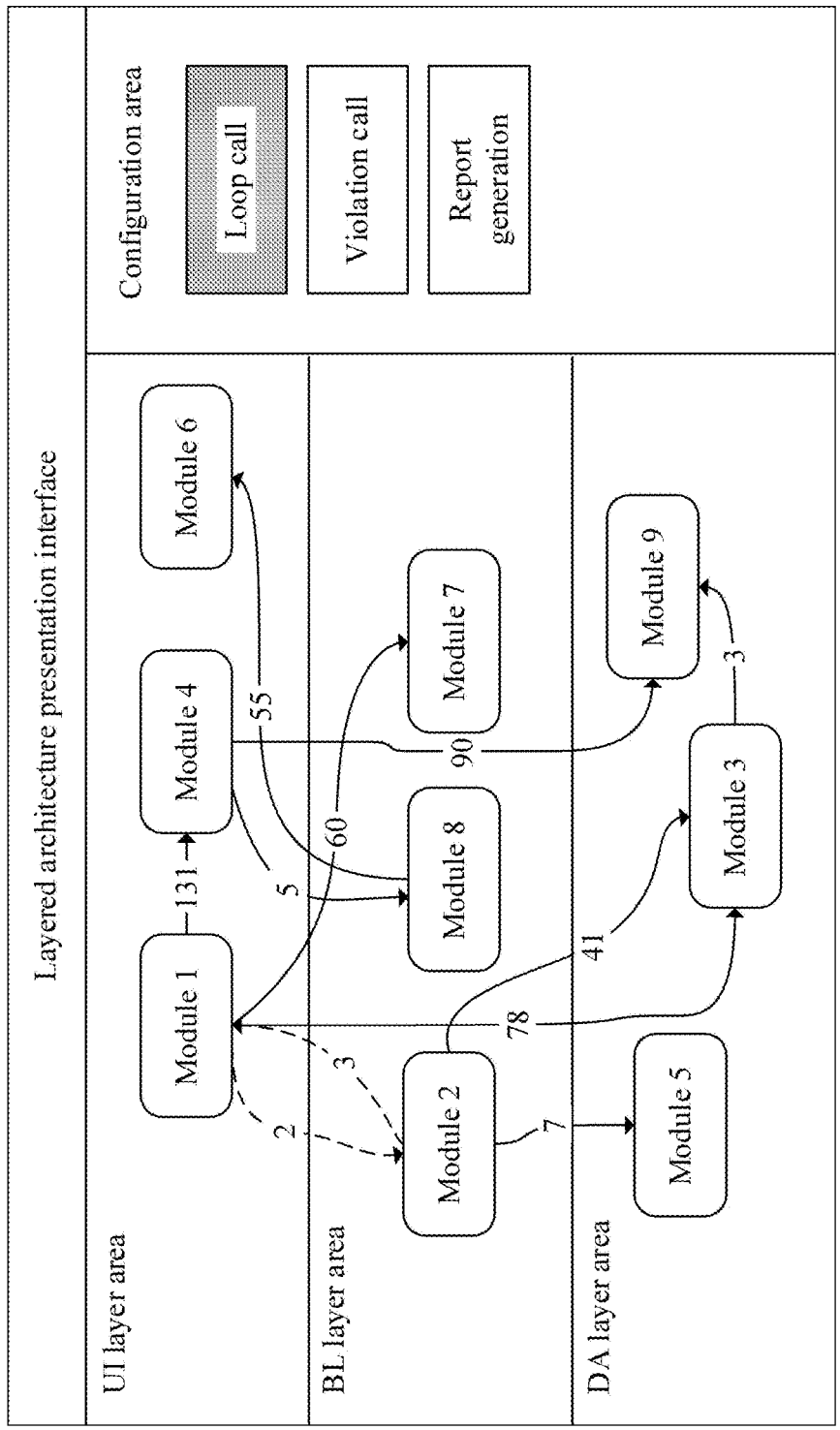
FIG. 7 is another schematic diagram of a layered architecture presentation interface.

Optionally, as shown in FIG. 7, if the user taps the loop call in the configuration area, the rule detection unit 1066 detects, based on the module call information, whether a loop call exists between two modules. If a loop call exists between two modules, the display driver 104 is indicated to display the detection result in the layered architecture presentation interface. For example, a dialog box pops up in the layered architecture presentation interface, and IDs of modules that have a loop call are displayed in the dialog box. For another example, colors of modules that have a loop call are changed in the layered architecture presentation interface. For another example, a color of an arrow between modules that have a loop call is changed in the layered architecture presentation interface. For another example, a format of an arrow between modules that have a loop call is changed in the layered architecture presentation interface, for example, changed from a solid line to a dashed line. In FIG. 7, because a loop call exists between the module 1 and the module 2, after the user taps "loop call", an arrow between the module 1 and the module 2 changes from a solid line to a dashed line.

Figure 8:
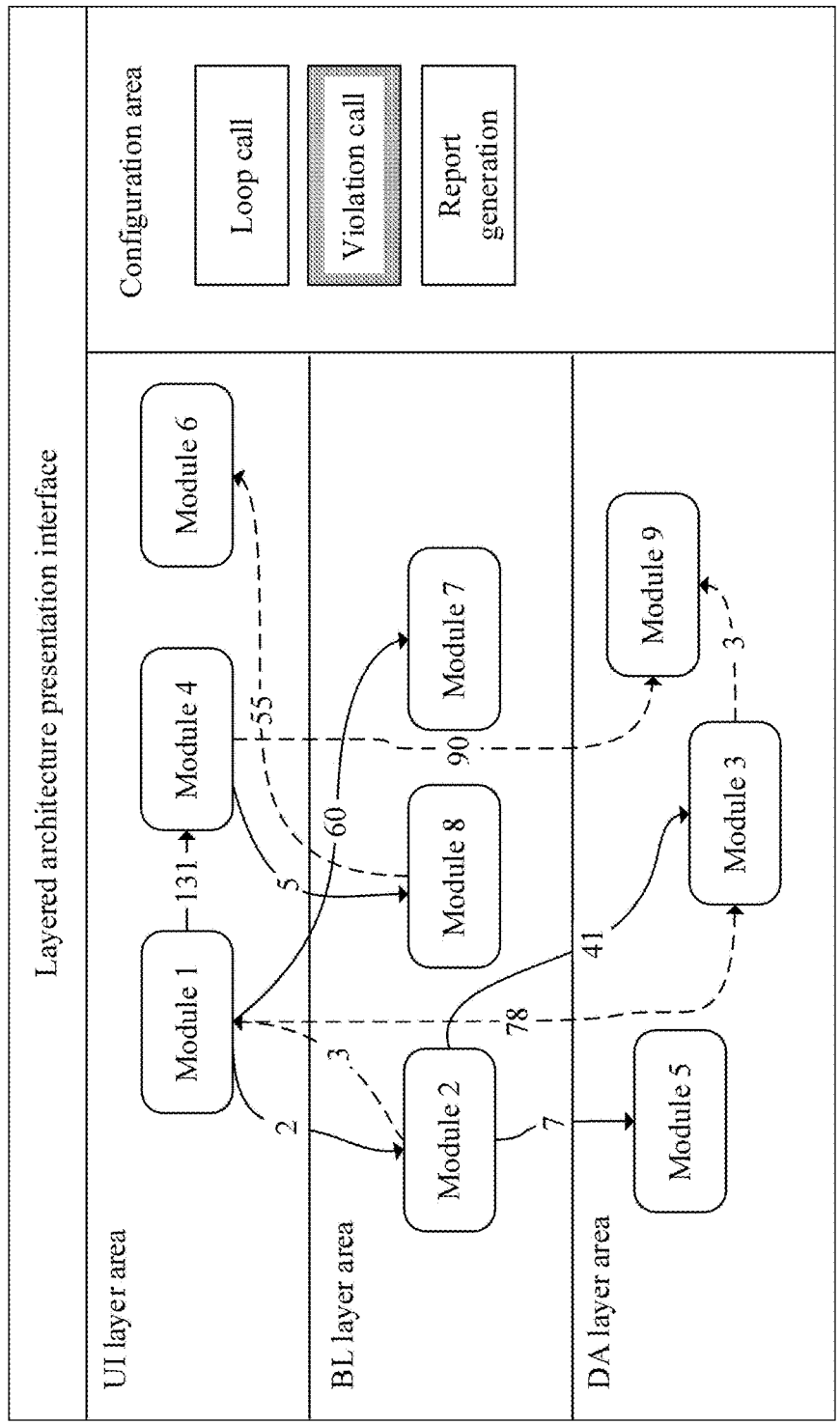
FIG. 8 is another schematic diagram of a layered architecture presentation interface.

Optionally, as shown in FIG. 8, if the user taps "violation call" in the configuration area, the rule detection unit 1066 detects, based on the module call information, whether a call that does not comply with a call rule exists between two modules. If a call that does not comply with a call rule exists between two modules, the display driver 104 is indicated to display the detection result in the layered architecture presentation interface. For example, a dialog box pops up in the layered architecture presentation interface, and IDs of modules that have a call that does not comply with a call rule and a specific call rule that is not complied with are displayed in the dialog box. For another example, colors of modules that have a call that does not comply with a call rule are changed in the layered architecture presentation interface. For another example, a color of an arrow between modules that have a call that does not comply with a call rule is changed in the layered architecture presentation interface. For another example, a format of an arrow between modules that have a call that does not comply with a call rule is changed in the layered architecture presentation interface, for example, changed from a solid line to a dashed line. A person skilled in the art may understand that displaying a call that does not comply with a call rule in the layered architecture presentation interface may be further implemented by using a combination of the foregoing different examples. In addition, there may be another equivalent implementation other than the foregoing examples.

In FIG. 8, a call by the module 2 to the module 1 does not comply with the call rule of the BL layer that a reverse call is not allowed. Therefore, after the user taps "violation call", an arrow of the call by the module 2 to the module 1 is changed from a solid line to a dashed line. A call by the module 8 to the module 6 does not comply with the call rule of the BL layer that a reverse call is not allowed. Therefore, after the user taps "violation call", an arrow of the call by the module 8 to the module 6 is changed from a solid line to a dashed line. A call by the module 1 to the module 3 does not comply with the call rule of the UI layer that a cross-layer call is not allowed. Therefore, after the user taps "violation call", an arrow of the call by the module 1 to the module 3 is changed from a solid line to a dashed line. A call by the module 4 to the module 9 does not comply with the call rule of the UI layer that a cross-layer call is not allowed. Therefore, after the user taps "violation call", an arrow of the call by module 4 to module 9 is changed from a solid line to a dashed line. A call by the module 3 to the module 9 does not comply with the call rule of the DA layer that an intra-layer call is not allowed. Therefore, after the user taps "violation call", an arrow of the call by module 3 to module 9 is changed from a solid line to a dashed line.

The foregoing manner of displaying the detection result in the layered architecture presentation interface is merely an example. In a specific implementation, the detection result may be provided to the user in another manner.

Optionally, if the user taps "report generation" in the configuration area, the rule detection unit 1066 indicates, based on the module call information and the call rule, the display driver 104 to generate a detection report and provides the detection report to the user. The detection report may include any one or more of the following: module call information, a detection result of a loop call, a detection result of a violation call, and a modification suggestion for a call relationship between modules.

After step 404, step 4041 and step 4012 may be first performed, and then step 406 to step 410 are performed. That is, the module call information presentation interface is first displayed to the user, and then the layered architecture presentation interface is displayed to the user. After step 404, step 406 to step 410 may be directly performed without performing step 4041 and step 4012. That is, the module call information presentation interface does not need to be displayed to the user; and the architecture setting is directly obtained, and then the layered architecture presentation interface is displayed to the user based on the architecture setting.

The modules are layered and displayed in different layer areas by using the layered architecture presentation interface, and the detection result of the call rule is also displayed to a user through the interface, so that the user can intuitively obtain a difference between the architecture model and the architecture setting, costs for the user to analyze a software architecture are reduced and an updating speed for an architecture module is improved.

After step 410, the user may clearly learn of, by using the detection result, a conflict between the architecture model developed by the user and both of the call rule and module layering designed by the user, and may further modify the architecture model based on the detection result. Further, the user may re-input a modified architecture model into the module analysis unit 1062 by using the I/O driver 102, so as to re-perform the software architecture analysis method provided in FIG. 3 on the modified architecture model, to further determine whether the modified architecture module conforms to the user design. In this case, an architecture analysis apparatus 106 may simultaneously provide the user with a module call information presentation interface and an analysis architecture presentation interface that are corresponding to the architecture model before being modified and a module call information presentation interface and an analysis architecture presentation interface that are corresponding to the architecture model after being modified.

Figure 9:
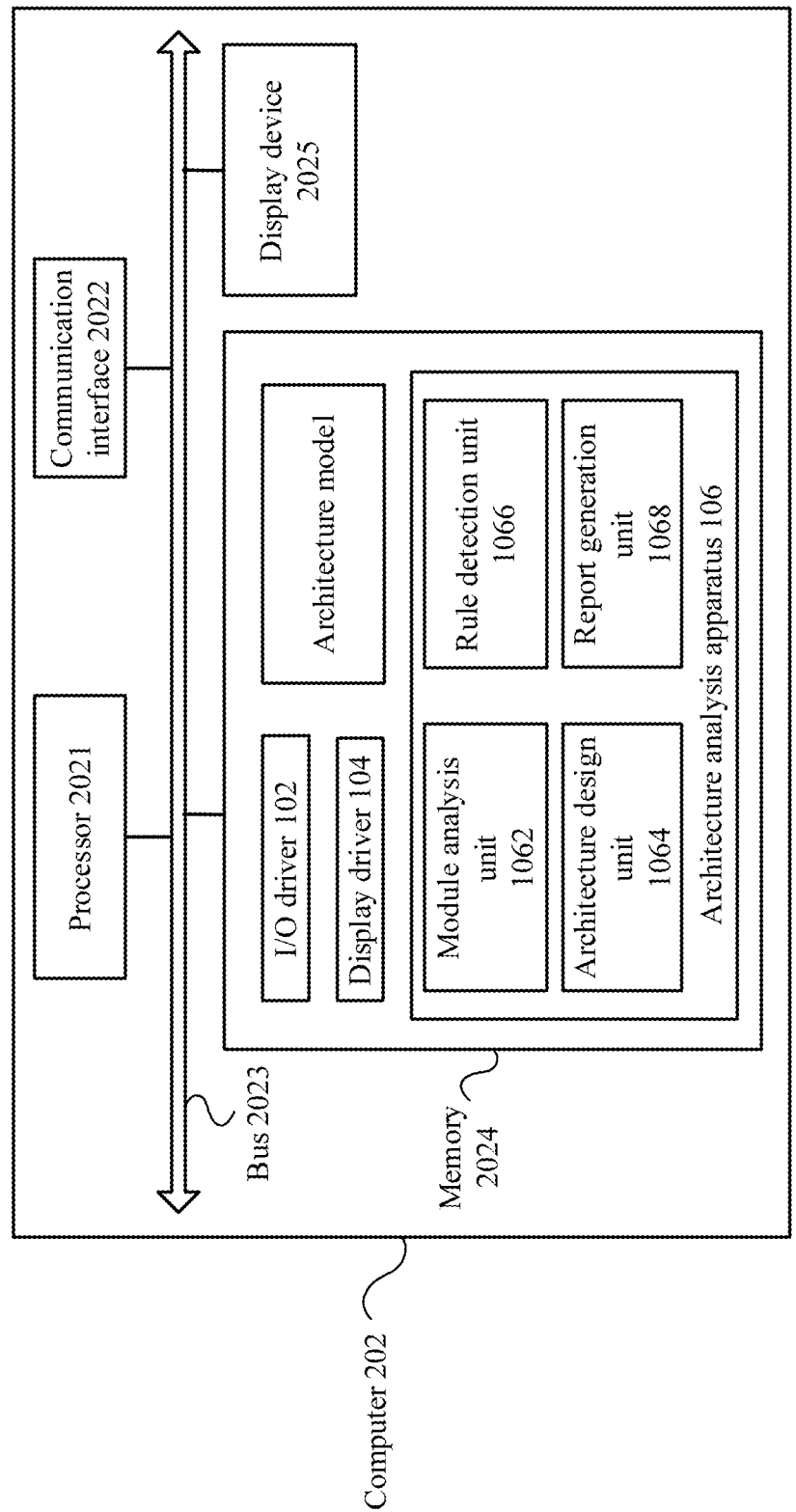
FIG. 9 is a schematic diagram of a structure of a computer used to run a software architecture analysis system.

FIG. 9 provides a computer 202. At least one computer 202 provided in FIG. 9 is deployed in the computer system. The computer 202 is applied to the first deployment manner described above. The computer 202 includes a bus 2023, a processor 2021, a communication interface 2022, a display device 2025, and a memory 2024. The processor 2021, the memory 2024, the display device 2025, and the communication interface 2022 communicate with each other by using the bus 2023. The communication interface 2022 is configured to communicate with the outside, for example, receive an architecture model and an architecture setting, and store the architecture model in the memory 2024.

The processor 2021 may be implemented by using a general-purpose central processing unit (CPU), a field-programmable gate array (FPGA), or another programmable logic device (PLD). The memory 2024 may include a volatile memory, for example, a random-access memory (RAM). The memory 2024 may further include a non-volatile memory, for example, a read-only memory (ROM), a flash memory, an HDD, or an SSD.

Figure 3:
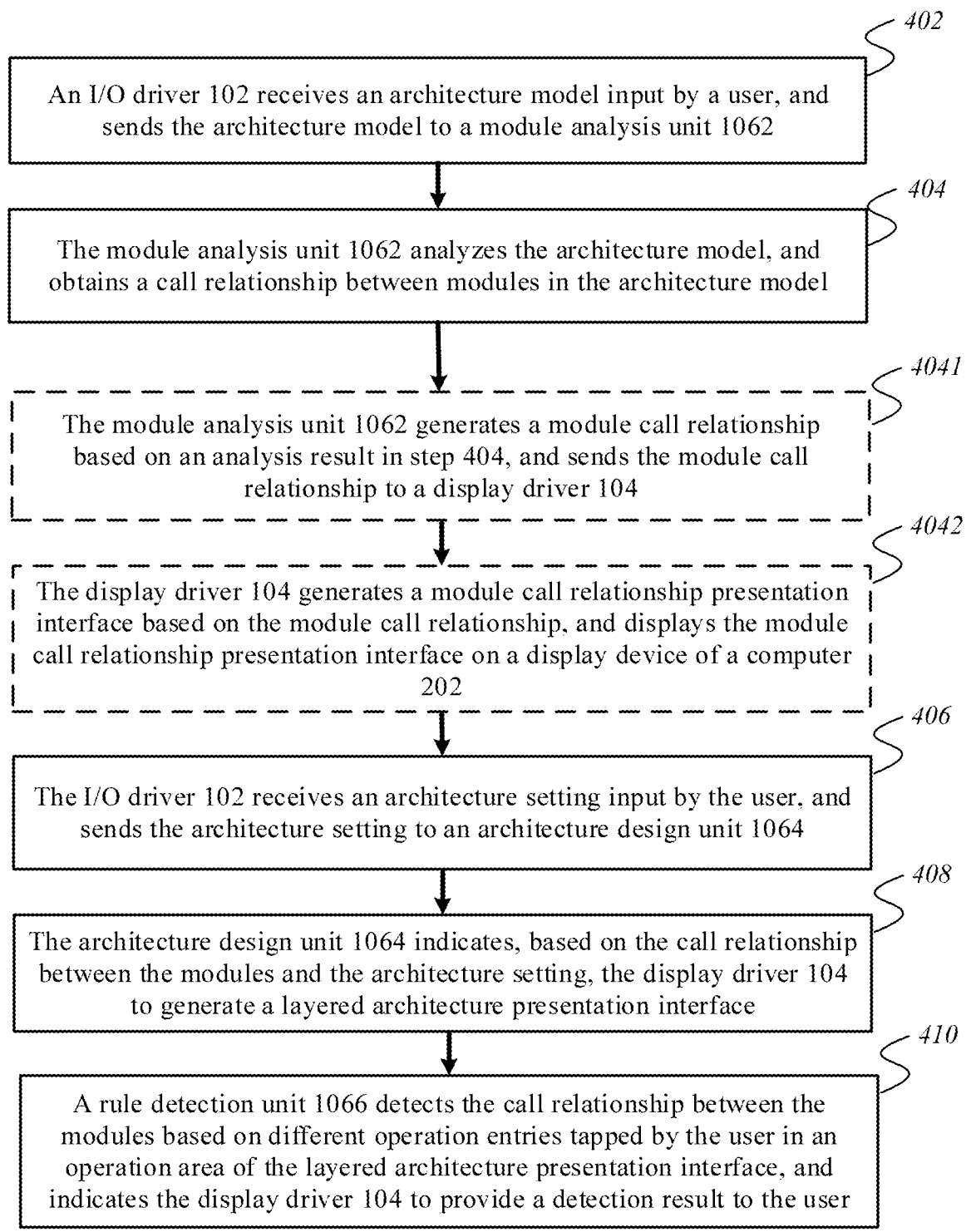
FIG. 3 is a schematic flowchart of a software architecture analysis method.

The memory 2024 stores executable instructions, and the processor 2021 executes the executable instructions to perform the software architecture analysis method provided in FIG. 3 described above. Specifically, the memory 2024 stores executable instructions to run the I/O driver 102, the display driver 104, the architecture analysis apparatus 106, and the units thereof. The memory 2024 may further include executable instructions required to run an operating system of the computer 202. The operating system may be Linux™, Unix™, Windows™, or the like.

The display device 2025 may be a display configured to provide various interfaces to a user. The computer 202 may further include various I/O devices for receiving architecture settings. The I/O driver 102 is a driver of the I/O device. The display driver 104 is a driver of the display device 2025.

Figure 10A:
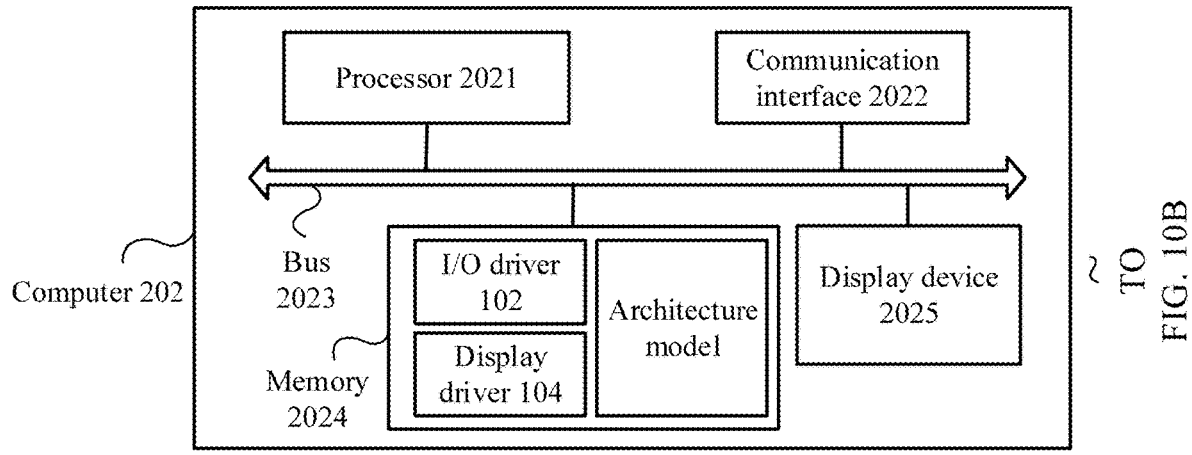
FIG. 10A, FIG. 10B, and FIG. 10C are a schematic diagram of a structure of a computer system used to run a software architecture analysis system.
Figure 10B:
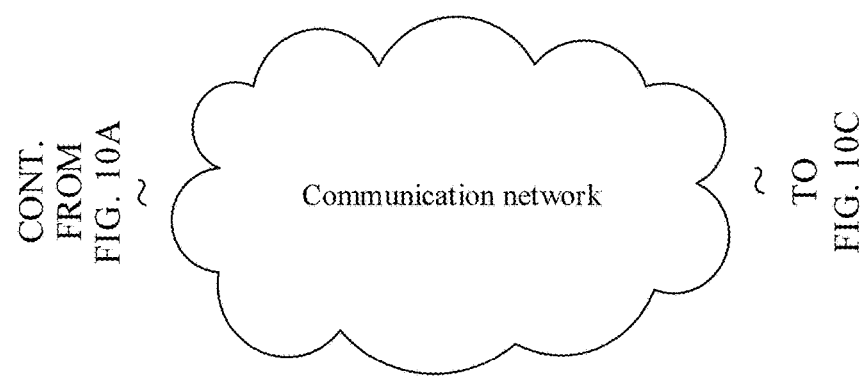
Figure 10C:
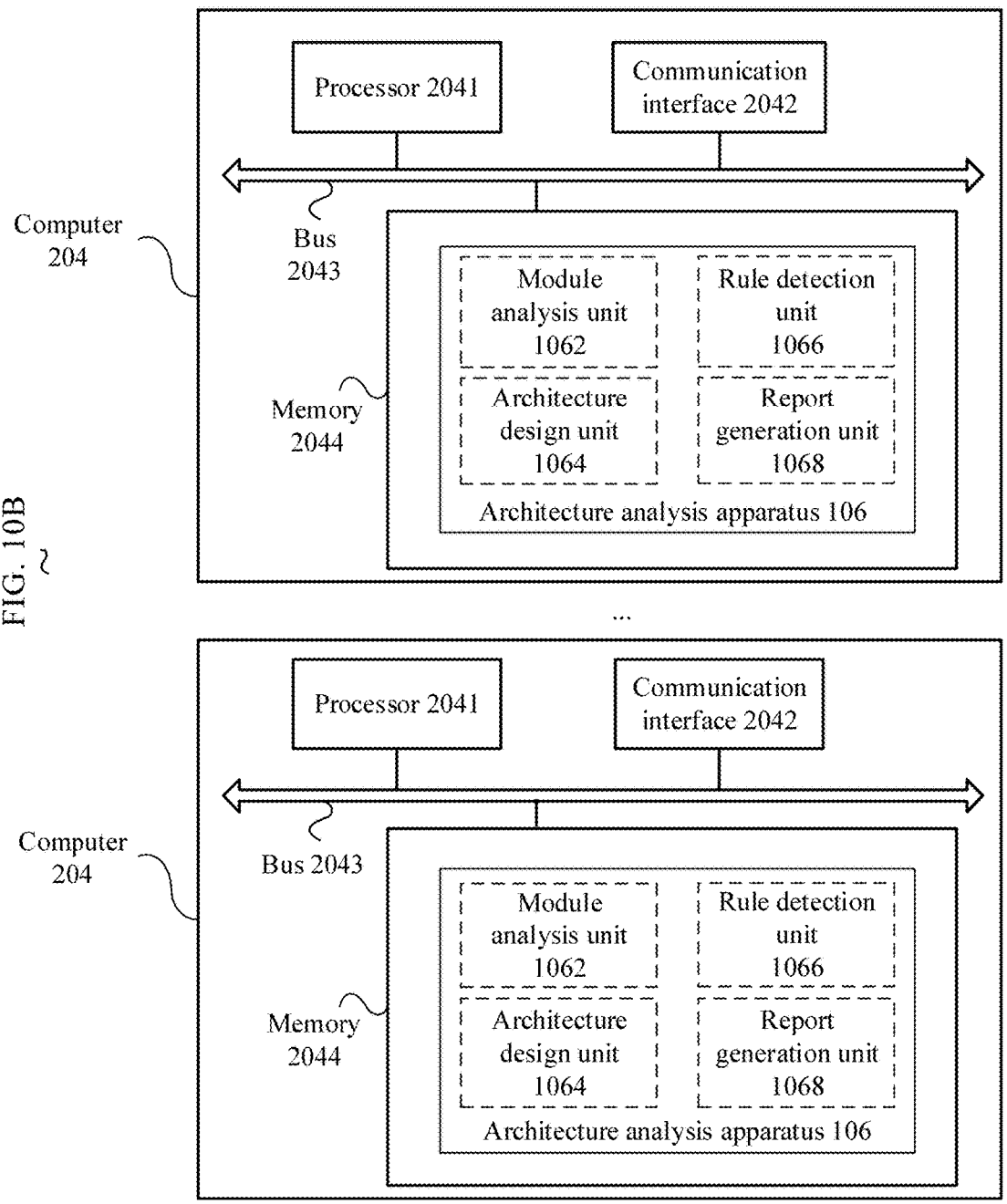

FIG. 10A, FIG. 10B, and FIG. 10C provide a computer system. The computer system is used in the foregoing second deployment manner described above. The computer system includes at least one computer 202 and at least one computer 204. The computer 204 and the computer 202 are connected through a communication network.

A hardware structure of the computer 202 in FIG. 10A is similar to that in FIG. 9. A difference is that only an I/O driver 102 and a display driver 104 are run in the computer 202 in FIG. 10A. In other words, a memory 2024 in FIG. 10A stores executable instructions. A processor 2021 executes the executable instructions to execute a part executed by the I/O driver 102 and the display driver 104 in the software architecture analysis method provided in FIG. 3 described above. Specifically, the memory 2024 stores executable instructions to run the I/O driver 102 and the display driver 104. A display device 2025 of the computer 202 in FIG. 10A may be a display configured to provide various interfaces to the user. The computer 202 may further include various I/O devices for receiving architecture settings. A communication interface 2022 of the computer 202 in FIG. 10A is configured to communicate with the computer 204.

The computer 204 includes a bus 2043, a processor 2041, a communication interface 2042, and a memory 2024. The processor 2041, the memory 2044, and the communication interface 2042 communicate with each other by using the bus 2043. The communication interface 2042 is configured to communicate with the computer 202, for example, receive an architecture model and an architecture setting that are sent by the I/O driver 102, and send module call information, the architecture setting, and a detection result to the display driver 104 of the computer 202, so that the display driver 104 generates various interfaces and detection results.

The processor 2041 may be implemented by using a general-purpose CPU, an FPGA, or another programmable logic device. The memory 2044 may include a volatile memory or a non-volatile memory. The memory 2044 stores executable instructions, and the processor 2041 executes the executable instructions to execute a part executed by the architecture analysis apparatus 106 and the unit thereof in the software architecture analysis method provided in FIG. 3 described above. Specifically, the memory 2044 stores executable instructions to run the architecture analysis apparatus 106 and the unit thereof described above. The memory 2044 may further include executable instructions required to run an operating system of the computer 204. The operating system may be Linux™, Unix™, Windows™, or the like.

The computer system in FIG. 10A, FIG. 10B, and FIG. 10C may include one or more computers 204. When the computer system includes one computer 204, the computer 204 runs all units of the architecture analysis apparatus 106. When the computer system includes a plurality of computers 204, in a deployment manner, each of the computers 204 runs all the units of the architecture analysis apparatus 106. In this deployment manner, each computer 204 has all functions of the architecture analysis apparatus 106. When there are many computers 202, numerous software architecture analysis tasks may be load-balanced to any computer 204, thereby improving an analysis capacity and analysis efficiency of a software architecture analysis system. Alternatively, when the computer system includes a plurality of computers 204, in another deployment manner, each computer 204 runs some units of the architecture analysis apparatus 106, and the plurality of computers 204 run all the units of the architecture analysis apparatus 106. In this deployment manner, some units are deployed on each computer 204, and there are fewer types of units running on each computer 204, thereby avoiding conflicts between units of different types, and improving an analysis capacity and analysis efficiency of the software architecture analysis system.

A description of a procedure corresponding to each of the accompanying drawings has a focus. For a part that is not described in detail in a procedure, refer to a related description of another procedure.

All or some of the foregoing embodiments may be implemented by using software, hardware, firmware, or any combination thereof. When software is used to implement embodiments, all or some of the embodiments may be implemented in a form of a computer program product. The computer program product includes one or more computer instructions. When the computer instructions are loaded and executed on a computer, the procedures or functions according to embodiments are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital tenant line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), or a semiconductor medium (for example, a solid-state drive (SSD)).

What is claimed is:

1. A method for software architecture analysis and comprising:
   importing an architecture model comprising modules, wherein each of the modules comprises at least one file;
   analyzing files comprised in the modules to obtain module call information, wherein the module call information comprises a call relationship among the modules;
   obtaining, from a user and using an input/output (I/O) driver, an architecture setting comprising a layering rule and a call rule, wherein the layering rule comprises set information of layers and a module comprised at each of the layers, wherein the set information comprises a sequence number of each layer, and wherein the call rule is between modules located at different layers or between modules comprised at each layer;
   instructing generation of a layered architecture presentation interface based on the layering rule and the module call information, wherein in the layered architecture presentation interface, each module is allocated to an area corresponding to a layer comprising the module and a location of each layer is set based on the sequence number of the layer;

detecting the module call information based on the call rule to obtain a detection result; and displaying the detection result using the layered architecture presentation interface by changing, in the layered architecture presentation interface, a color or a format of an arrow corresponding to a call that is between modules and that violates the call rule.

2. The method of claim 1, wherein analyzing the files comprises counting a first quantity of times that a file comprised in each module calls a file comprised in another module to obtain a second quantity of calls between the modules.

3. The method of claim 2, further comprising displaying the second quantity in the layered architecture presentation interface.

4. The method of claim 1, further comprising displaying the call relationship using an arrow in the layered architecture presentation interface.

5. The method of claim 1, wherein the call rule is between modules located at different layers and comprises an adjacent-layer call rule, a cross-layer call rule, or a reverse call rule.

6. The method of claim 1, wherein in the layered architecture presentation interface, colors or textures of areas corresponding to adjacent layers are different.

7. A computer system comprising:
a computer comprising:
a memory comprising an input/output (I/O) driver and configured to store instructions; and
a processor coupled to the memory and configured to execute the instructions to cause the computer system to:
import an architecture model comprising modules, wherein each of the modules comprises at least one file;
analyze files comprised in the modules to obtain module call information, wherein the module call information comprises a call relationship among the modules;
obtain, from a user and using the I/O driver, an architecture setting comprising a layering rule and a call rule, wherein the layering rule comprises set information of layers and a module comprised at each of the layers, and wherein the call rule is between modules located at different layers or between modules comprised at each layer;
instruct generation of a layered architecture presentation interface based on the layering rule and the module call information, wherein in the layered architecture presentation interface, each module is allocated to an area corresponding to a layer comprising the module;
detect the module call information based on the call rule to obtain a detection result;
display the detection result using the layered architecture presentation interface by changing, in the layered architecture presentation interface, a color or a format of an arrow corresponding to a call that is between modules and that violates the call rule; and
analyze the files by counting a first quantity of times that a file comprised in each module calls a file comprised in another module to obtain a second quantity of calls between the modules.

8. The computer system of claim 7, wherein the set information comprises a sequence number of each layer, and wherein in the layered architecture presentation interface, a location of each layer is set based on the sequence number of the layer.

9. The computer system of claim 7, wherein the processor is further configured to execute the instructions to cause the computer system to display the second quantity in the layered architecture presentation interface.

10. The computer system of claim 7, wherein the processor is further configured to execute the instructions to cause the computer system to display the call relationship using an arrow in the layered architecture presentation interface.

11. The computer system of claim 7, wherein the call rule is between modules located at different layers and comprises an adjacent-layer call rule, a cross-layer call rule, or a reverse call rule.

12. The computer system of claim 7, wherein in the layered architecture presentation interface, color or textures of areas corresponding to adjacent layers are different.

13. A computer program product comprising instructions that are stored on a non-transitory computer-readable medium and that, when executed by a processor, cause a computer system to:
import an architecture model comprising modules, wherein each of the modules comprises at least one file;
analyze files comprised in the modules to obtain module call information, wherein the module call information comprises a call relationship among the modules;
obtain, from a user and using an input/output (I/O) driver, an architecture setting comprising a layering rule and a call rule, wherein the layering rule comprises set information of layers and a module comprised at each of the layers, wherein the call rule is between modules located at different layers or between modules comprised at each layer, wherein the call rule is between modules located at different layers and comprises a cross-layer call rule or a reverse call rule, wherein the cross-layer call rule indicates whether a call between modules at layers with non-adjacent layer sequence numbers is allowed, and wherein the reverse call rule indicates whether a call between a module at a lower layer in a software architecture and a module at an upper layer in the software architecture is allowed;
instruct generation of a layered architecture presentation interface based on the layering rule and the module call information, wherein in the layered architecture presentation interface, each module is allocated to an area corresponding to a layer comprising the module;
detect the module call information based on the call rule to obtain a detection result; and
display the detection result by using layered architecture presentation interface by changing, in the layered architecture presentation interface, a color or a format of an arrow corresponding to a call that is between modules and that violates the call rule.

14. The computer program product of claim 13, wherein the set information comprises a sequence number of each layer, and wherein in the layered architecture presentation interface, a location of each layer is set based on the sequence number of the layer.

15. The computer program product of claim 13, wherein the instructions, when executed by the processor, further cause the computer system to analyze the files by counting a first quantity of times that a file comprised in each module calls a file comprised in another module to obtain a second quantity of calls between the modules.

16. The computer program product of claim 15, wherein the instructions, when executed by the processor, further cause the computer system to display the second quantity in the layered architecture presentation interface.

17. The computer program product of claim 13, wherein the instructions, when executed by the processor, further cause the computer system to display the call relationship using an arrow in the layered architecture presentation interface.

18. The computer program product of claim 13, wherein in the layered architecture presentation interface, colors or textures of areas corresponding to adjacent layers are different.

19. The method of claim 5, wherein the cross-layer call rule indicates whether a call between modules at layers with non-adjacent layer sequence numbers is allowed, and wherein the reverse call rule indicates whether a call between a module at a lower layer in a software architecture and a module at an upper layer in the software architecture is allowed.

20. The computer system of claim 11, wherein the cross-layer call rule indicates whether a call between modules at layers with non-adjacent layer sequence numbers is allowed, and wherein the reverse call rule indicates whether a call between a module at a lower layer in a software architecture and a module at an upper layer in the software architecture is allowed.

* * * * *